US006929576B2

(12) United States Patent
Armstrong et al.

(10) Patent No.: US 6,929,576 B2

(45) Date of Patent: Aug. 16, 2005

(54) POWER TRANSMISSION FOR A VEHICLE

(75) Inventors: Paula J. Armstrong, Canton, MI (US); Scott H. Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 17 days.

(21) Appl. No.: 10/693,685

(22) Filed: Oct. 24, 2003

(65) Prior Publication Data

US 2005/0090354 A1 Apr. 28, 2005

(51) Int. Cl.[7] .............................. F16H 3/62; F16H 3/44

(52) U.S. Cl. ....................... 475/278; 475/282; 475/288

(58) Field of Search ............................ 475/277–8, 282, 475/288; 74/606 R

(56) References Cited

U.S. PATENT DOCUMENTS 3,765,519 A * 10/1973 Kell ...................... 192/85 AA
4,426,891 A * 1/1984 Kubo et al. .................. 475/146
4,831,892 A * 5/1989 Shindo et al. ............ 74/606 R
5,106,352 A 4/1992 Lepelletier .................. 475/280
5,277,673 A * 1/1994 Nakayama et al. ......... 475/278
5,295,924 A * 3/1994 Beim ......................... 475/278
6,135,912 A 10/2000 Tsukamoto et al. ......... 475/271
6,176,802 B1 * 1/2001 Kasuya et al. .............. 475/269
6,464,612 B2 * 10/2002 Frost .......................... 475/288
6,499,578 B1 * 12/2002 Kundermann et al. ... 192/87.11
6,572,507 B1 6/2003 Korkmaz et al. ........... 475/276
6,655,232 B2 * 12/2003 Fujikawa et al. ......... 74/606 R
6,773,370 B2 * 8/2004 Martyka et al. ............ 475/278

* cited by examiner

*Primary Examiner*—Roger Pang
(74) *Attorney, Agent, or Firm*—Leslie C. Hodges

(57) ABSTRACT

A power transmission includes three interconnected planetary gearsets and five selectively engageable torque-transmitting mechanisms. The planetary gearsets and torque-transmitting mechanisms are disposed within a transmission housing. The torque-transmitting mechanisms are selectively engageable to provide six forward speed ratios and one reverse speed ratio in the planetary gearsets between an input shaft and an output shaft.

6 Claims, 6 Drawing Sheets

POWER TRANSMISSION FOR A VEHICLE

TECHNICAL FIELD

This invention relates to power transmissions for vehicles and, more particularly, to multi-speed power transmissions providing a plurality of forward drives and a reverse drive through the selective manipulation of friction torque-transmitting mechanisms.

BACKGROUND OF THE INVENTION

Automatic power transmissions are currently used in a number of passenger vehicles sold within this country. As is well known, the automatic transmission provides a plurality of planetary speed ratios in both the forward direction and at least one reverse speed ratio. These speed ratios are established through the use of a plurality of planetary gearsets, which are controlled by a number of fluid-operated friction torque-transmitting mechanisms, commonly termed clutches and brakes.

It has become a standard to provide at least four forward speed ratios in automatic transmissions for use in passenger vehicles. More recently, automobile manufacturers have increased the forward speed ratios to five and in some instances six. This, of course, requires the addition of planetary gearsets as well as trying to maintain the number of torque-transmitting mechanisms at a minimum.

A number of the currently proposed six speed planetary transmissions provide three planetary gearsets and five friction torque-transmitting mechanisms. This gives rise to a packaging situation for the positioning of the torque-transmitting mechanisms within the transmission environment.

One such transmission is described in U.S. Pat. No. 5,106,352 issued to Lepelletier Apr. 21, 1992. This power transmission provides six forward speed ratios and employs an input gearset and a ratio gearset. The input gearset of Lepelletier has a stationary member in the forward planetary gearset to provide an underdrive input to the ratio gearset, which is preferably a Ravigneaux-type set.

U.S. Pat. No. 6,135,912 issued to Tsukamoto, et al. Oct. 24, 2000, provides solutions for packaging the friction devices within the Lepelletier type of six-speed transmission. However, there are many other six-speed planetary gearsets with five torque-transmitting mechanisms that cannot be accommodated by the Tsukamoto, et al. arrangement.

SUMMARY OF THE INVENTION

It is an object of the present invention to provide an improved power transmission having three planetary gearsets and five torque-transmitting mechanisms providing six forward speed ratios and one reverse speed ratio.

In one aspect of the present invention, one of the planetary gearsets is selectively connectible with a transmission input shaft through two rotating type torque-transmitting mechanisms.

In another aspect of the present invention, the same two members of the planetary gearset are selectively connectible with a transmission housing through two selectively engageable stationary torque-transmitting mechanisms.

In yet another aspect of the present invention, a member of another of the planetary gearsets is continuously drivingly connected with the transmission input shaft. Also, one member thereof is continuously connected with a member of the first mentioned planetary gearset.

In still another aspect of the present invention, another of the planetary gearsets has one member selectively connectible with the transmission housing through a selectively engageable stationary torque-transmitting mechanism, one member continuously connectible with a member of the first mentioned planetary gearset, and another member continuously connected with a member of the second mentioned planetary gearset.

In yet still another aspect of the present invention, the planetary gearsets and the torque-transmitting mechanisms are disposed within a transmission housing comprised of a forward or front end wall or cover, a rear end wall or cover, and an outer facing.

In a further aspect of the present invention, the transmission input shaft is rotatably supported in the front end wall and the output shaft is rotatably supported in the rear end wall.

In a yet further aspect of the present invention, the front end wall and rear end wall are interconnected by the outer transmission shell and the walls and shell define a transmission gearing space.

In a still further aspect of the present invention, at least two of the torque-transmitting mechanisms have servomechanisms slidably disposed in chambers formed or supported by the front end wall of the transmission.

In a yet still further aspect of the present invention, a third of the torque-transmitting mechanisms has a servomechanism slidably supported within a chamber of the rear end wall of the transmission.

In yet a further aspect of the present invention, the two remaining torque-transmitting mechanisms are disposed within housings rotatably connected with the input shaft.

DESCRIPTION OF THE EXEMPLARY EMBODIMENTS

Figure 1:
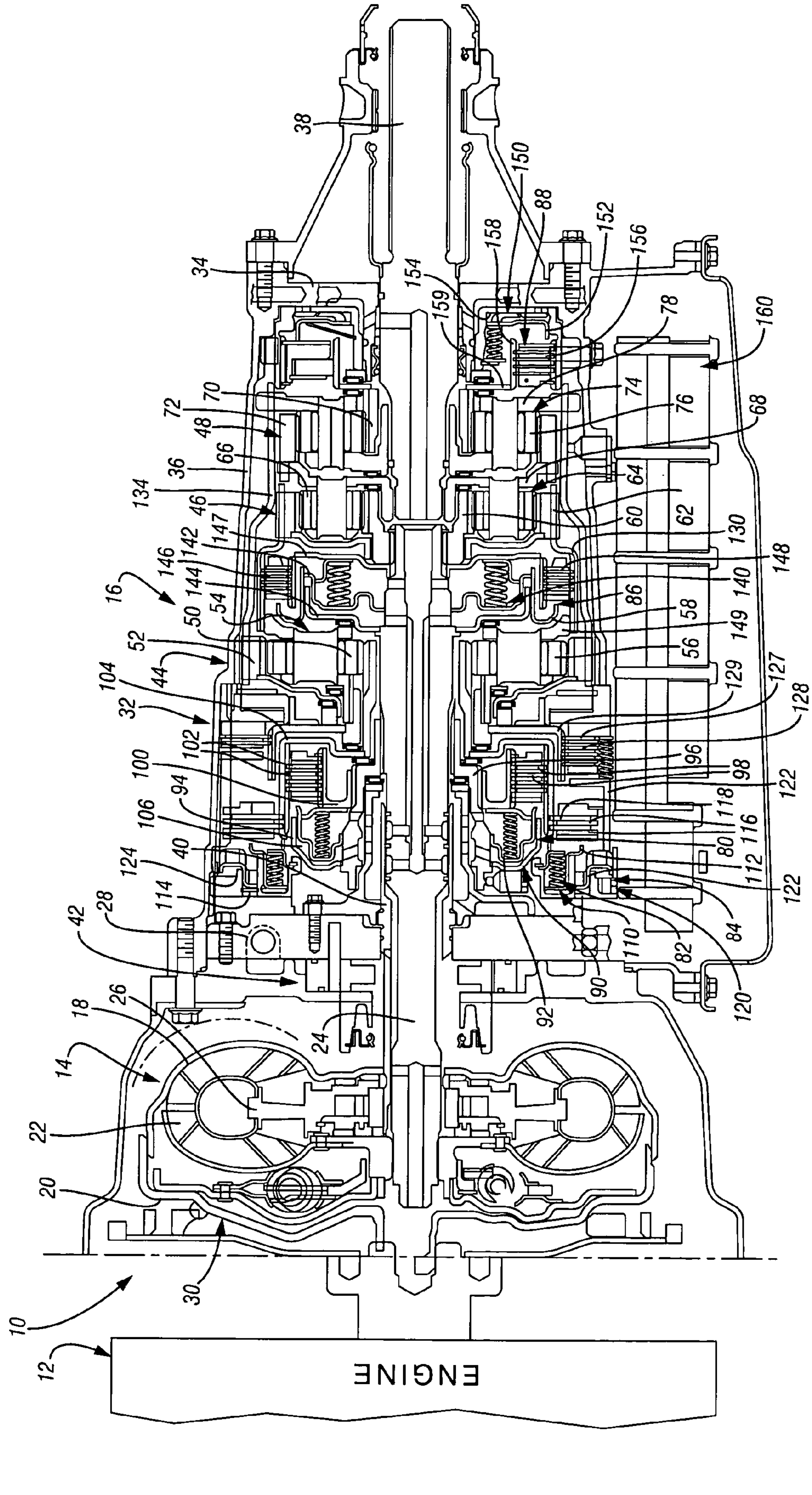
FIG. 1 is a cross-sectional elevational view of a powertrain incorporating one embodiment of the present invention.

Referring to the drawings, wherein like characters represent the same or corresponding parts throughout the several views, there is seen in FIG. 1 a powertrain 10 incorporating a conventional internal combustion engine 12 drivingly connected with a conventional torque converter assembly 14, and a power transmission 16. The torque converter 14 includes an impeller member 18 drivingly connected through an input shell and flex plate 20 by the engine 12, a turbine 22 drivingly connected with a transmission input shaft 24, a stator 26 grounded through a one-way device with a front end wall or cover 28 of the transmission 16, and a conventional torque converter clutch 30, which selectively connects the turbine 22 directly with the engine 12.

The power transmission 16 also includes a housing, generally designated 32, incorporating the front end wall 28, a rear end wall or cover 34, and an outer housing or shell 36 interconnecting the front end wall 28 and the rear end wall 34. If desired, the rear end wall 34 can be formed integrally with the shell 36 as a single casting, which is well known in the art of power transmissions.

The power transmission 16 also includes the input shaft 24 and an output shaft 38. The input shaft 24 is rotatably supported in the front end cover 28 through a sleeve 40, which also connects the stator 26 and its one-way device with the front end wall 28. The front end wall 28 also supports a hydraulic pump 42, which is adapted to supply fluid pressure to various components within the transmission 16 as well as the torque converter 14. As is well known, the hydraulic system of a transmission also supplies lubricating fluid and cooling fluid for the transmission components.

The power transmission 16 has three planetary gearsets 44, 46, and 48 that are disposed within the transmission housing 32. The planetary gearset 44 includes a sun gear member 50, a ring gear member 52, and a planet carrier assembly member 54. The planet carrier assembly member 54 includes a plurality of pinion gears 56 rotatably mounted on a planet carrier member 58 and disposed in meshing relationship with both the sun gear member 50 and the ring gear member 52.

The planetary gearset 46 includes a sun gear member 60, a ring gear member 62, and a planet carrier assembly member 64. The planet carrier assembly member 64 includes a plurality of pinion gears 66 rotatably supported on a planet carrier member 68 and disposed in meshing relationship with both the sun gear member 60 and the ring gear member 62.

The planetary gearset 48 includes a sun gear member 70, a ring gear member 72, and a planet carrier assembly member 74. The planet carrier assembly member 74 includes a plurality of pinion gears 76 rotatably supported on a planet carrier member 78 and disposed in meshing relationship with both the sun gear member 70 and the ring gear member 72.

The transmission 16 also includes five torque-transmitting mechanisms 80, 82, 84, 86, and 88. The torque-transmitting mechanism 80 has a hydraulic servomechanism 90 including a fluid-operated piston 92 slidably disposed in a housing 94, which is drivingly connected through a hub 96 with the input shaft 24. The torque-transmitting mechanism 80 also includes a plurality of friction plates 98, which are splined to a hub 100, which is also drivingly connected with the hub 96. A further set of friction plates 102 of the torque-transmitting mechanism 80 are splined to a housing or hub 104, which is continuously connected with the sun gear member 50. The torque-transmitting mechanism 80 is a rotating type torque-transmitting mechanism, which when engaged by fluid pressure in a chamber 106 will enforce engagement of the friction plates 102 and 98 to thereby provide a drive connection between the input shaft 24 and the sun gear member 50.

The torque-transmitting mechanism 82 includes a hydraulic servomechanism 110, which includes a piston 112 slidably disposed in a chamber 114 formed in the front end wall 28. The torque-transmitting mechanism 82 also includes a plurality of friction plates 118 splined with the hub 104 and interdigitated with a plurality of friction plates 116 splined to the shell 36 of the housing 32. The torque-transmitting mechanism 82 is a stationary type torque-transmitting mechanism, commonly termed a brake, which when engaged by fluid pressure in the chamber 114 will hold the sun gear member 50 stationary.

The torque-transmitting mechanism 84 includes a hydraulic servomechanism 120 having a piston 122 slidably disposed in a chamber 124 and having an extension 126, which is adapted to engage a plurality of friction plates 128 and 127, which are splined to the shell 36 and a hub 129, respectively. The hub 129 is drivingly connected with the planet carrier member 58 such that engagement of the torque-transmitting mechanism 84 will hold the planet carrier member 58 stationary. The planet carrier member 58 is continuously connected with the ring gear member 62 through a hub 130 such that engagement of the torque-transmitting mechanism 84 will also hold the ring gear member 62 stationary.

The planet carrier member 68 of the planetary gearset 46 is continuously connected with the ring gear member 72 of the planetary gearset 48. The ring gear member 52 of the planetary gearset 44 and the planet carrier member 78 of the planetary gearset 48 are continuously interconnected through a shell 134. Thus, the ring gear member 52 and planet carrier member 78 rotate in unison with the output shaft 38.

The torque-transmitting mechanism 86 has a hydraulic servomechanism 140, which includes a piston 142 slidably disposed in a housing 144, which is drivingly connected with the input shaft 24. The torque-transmitting mechanism 86 also includes a plurality of friction plates 146, which are splined to a hub 147, which is drivingly connected with the input shaft 24. The torque-transmitting mechanism 86 also includes a plurality of friction plates 148, which are splined to the hub 130 connected between the planet carrier member 58 and the ring gear member 62. The friction plates 146 and 148 are forced into frictional engagement by an apply plate or extension 149, which is operatively connected with the piston 142, such that when the piston 142 is energized by fluid pressure, the friction plates 146 and 148 will cause co-rotation of the input shaft 24, the planet carrier member 58, and the ring gear member 62.

The torque-transmitting mechanism 88 includes a hydraulic servomechanism 150, which includes a piston member 152 slidably disposed in a chamber 154 formed in the end wall 34. The torque-transmitting mechanism 88 also includes a plurality of friction plates 156 splined to the shell 36 and a plurality of friction plates 158 that are splined to a hub 159, which is continuously connected with the sun gear member 70. The torque-transmitting mechanism 88 is a stationary type torque-transmitting mechanism, or brake, which when engaged will cause the sun gear member 70 to be engaged with the transmission housing 32, thereby holding the sun gear member 70 stationary.

The torque-transmitting mechanisms 80, 82, 84, 86, and 88 are controlled by a conventional electro-hydraulic control mechanism 160. As is well known, these types of mechanisms include a programmable digital computer and a plurality of hydraulic valves, which are disposed within a housing and supply fluid pressure at the desired pressure levels to permit operation of the torque-transmitting mechanisms as well as the operation of the torque converter 14 and the torque converter clutch 30.

The electro-hydraulic control mechanism 160 supplies fluid pressure through the front end wall 28 and the input shaft 24 as well as through the rear end wall 34 and the output shaft 38. The selective control and engagement of the torque-transmitting mechanisms 80, 82, 84, 86, and 88 in combinations of two will provide six forward speed ratios and one reverse speed ratio between the input shaft 24 and the output shaft 38.

The reverse speed ratio is established with the engagement of the torque-transmitting mechanisms 80 and 84. The first forward speed ratio is established with the engagement of the torque-transmitting mechanisms 88 and 84. The second forward speed ratio is established with the engagement of the torque-transmitting mechanisms 88 and 82. The third forward speed ratio is established with the engagement of the torque-transmitting mechanisms 88 and 80. The fourth forward speed ratio is established with the engagement of the torque-transmitting mechanisms 88 and 86. The fifth forward speed ratio is established with the engagement of the torque-transmitting mechanisms 80 and 86. The sixth forward speed ratio is established with the engagement of the torque-transmitting mechanisms 82 and 86. The establishment and interchange of the speed ratios by the control mechanism 160 is performed in a manner well known to those skilled in the art and need not be gone into detail at this point.

Figure 2:
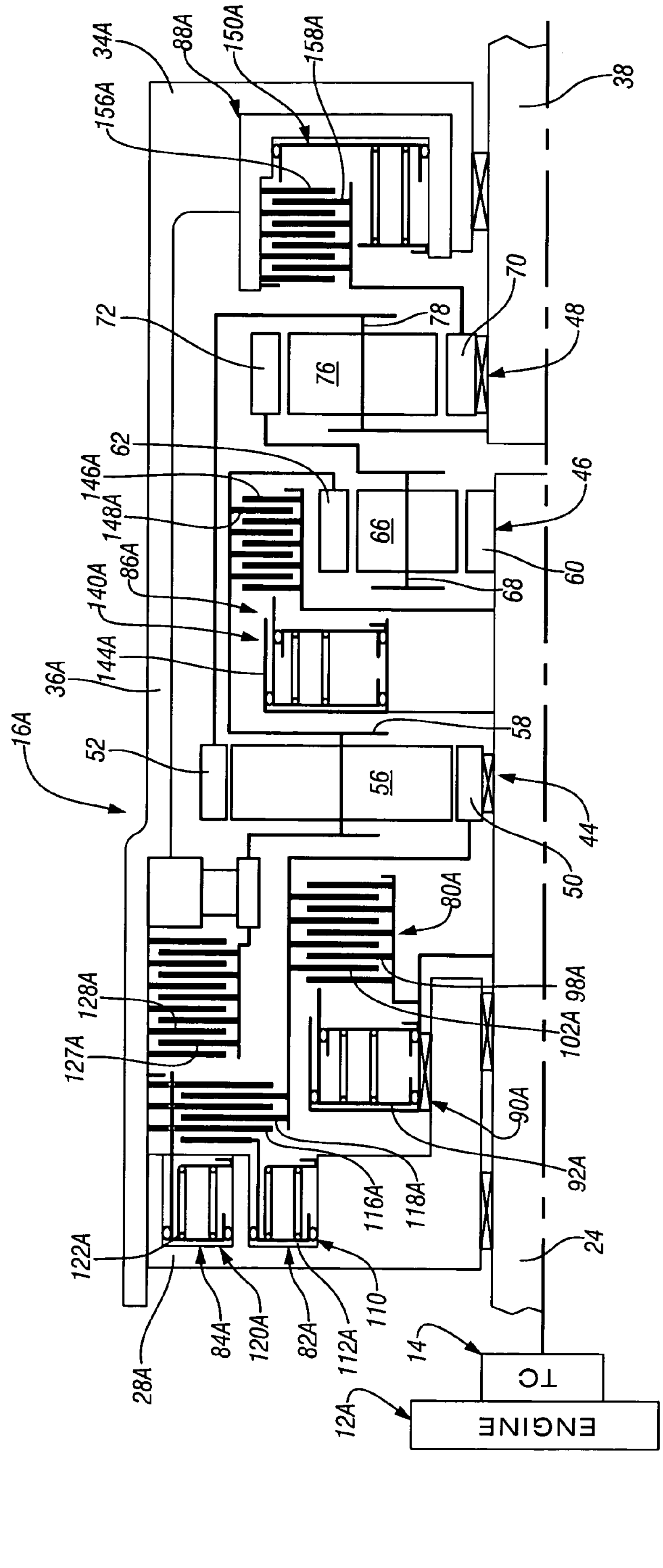
FIG. 2 is a diagrammatic depiction showing the powertrain of FIG. 1.

The diagrammatic depiction of the power transmission 16A shown in FIG. 2 depicts the hydraulic servomechanisms 110A and 120A of the torque-transmitting mechanisms 82A and 84A to be disposed within the end wall 28A. As can be assumed from the previous sentence, the mechanisms similar to FIG. 1 are given the same numerical designation with an A suffix. The servomechanism 90A of the torque-transmitting mechanism 80A is shown as disposed in a rotatable housing 94A, which is drivingly connected with the input shaft 24. The servomechanism 140A of the torque-transmitting mechanism 86A is shown as being disposed within the housing 144A, which is drivingly connected with the input shaft 24. The servomechanism 150A of the torque-transmitting mechanism 88A is disposed within the rear end wall 34A. It will be appreciated, as described above, that the torque-transmitting mechanisms 80A and 86A are rotating-type torque-transmitting mechanisms, or clutches, and the torque-transmitting mechanisms 82A, 84A, and 88A are stationary-type torque-transmitting mechanisms, commonly termed brakes or stationary clutches.

Figure 3:
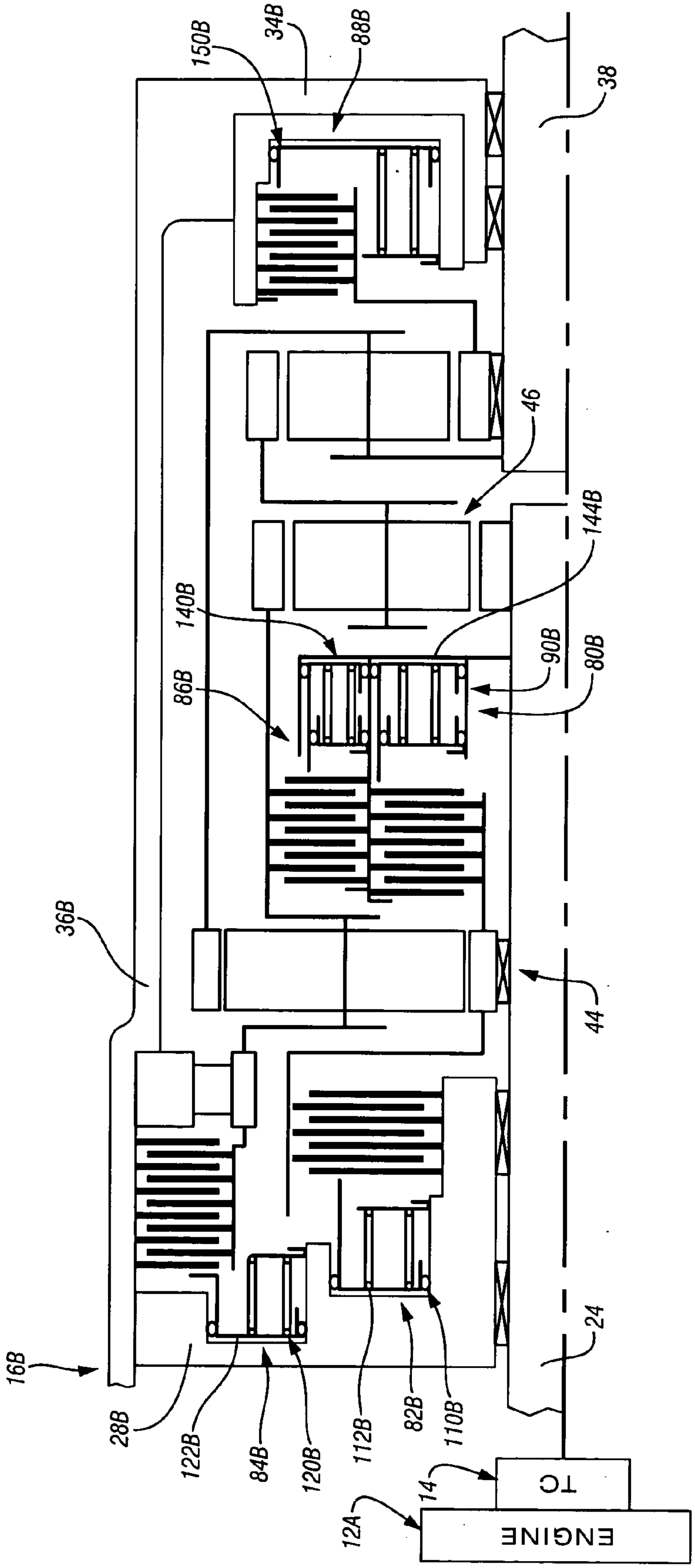
FIG. 3 is a diagrammatic depiction of another embodiment of the present invention.

The diagrammatic depiction of the power transmission 16B shown in FIG. 3 illustrates the pistons 112B and 122B of the servomechanisms 110B and 120B of the torque-transmitting mechanisms 82B and 84B, respectively, as being slidably disposed in chambers formed in the front end wall 28B. The torque-transmitting mechanisms 86B and 80B have the respective hydraulic servomechanisms 140B and 90B slidably disposed in a housing 144B. Therefore, the housing 144B serves the same function and the housing 144A and 94A, which are shown in FIG. 2.

The torque-transmitting mechanisms 80B and 86B are disposed axially between the planetary gearsets 44 and 46. The servomechanism 150B of the torque-transmitting mechanism 88 is disposed within the rear end wall 34B. The operation and engagement sequence of the torque-transmitting mechanisms is the same as that described above for FIG. 1. The only significant difference between FIGS. 1 and 3 is the disposition of the torque-transmitting mechanism 80B being moved from support on the front end wall 28B to support between the planetary gearsets 44 and 46.

Figure 4:
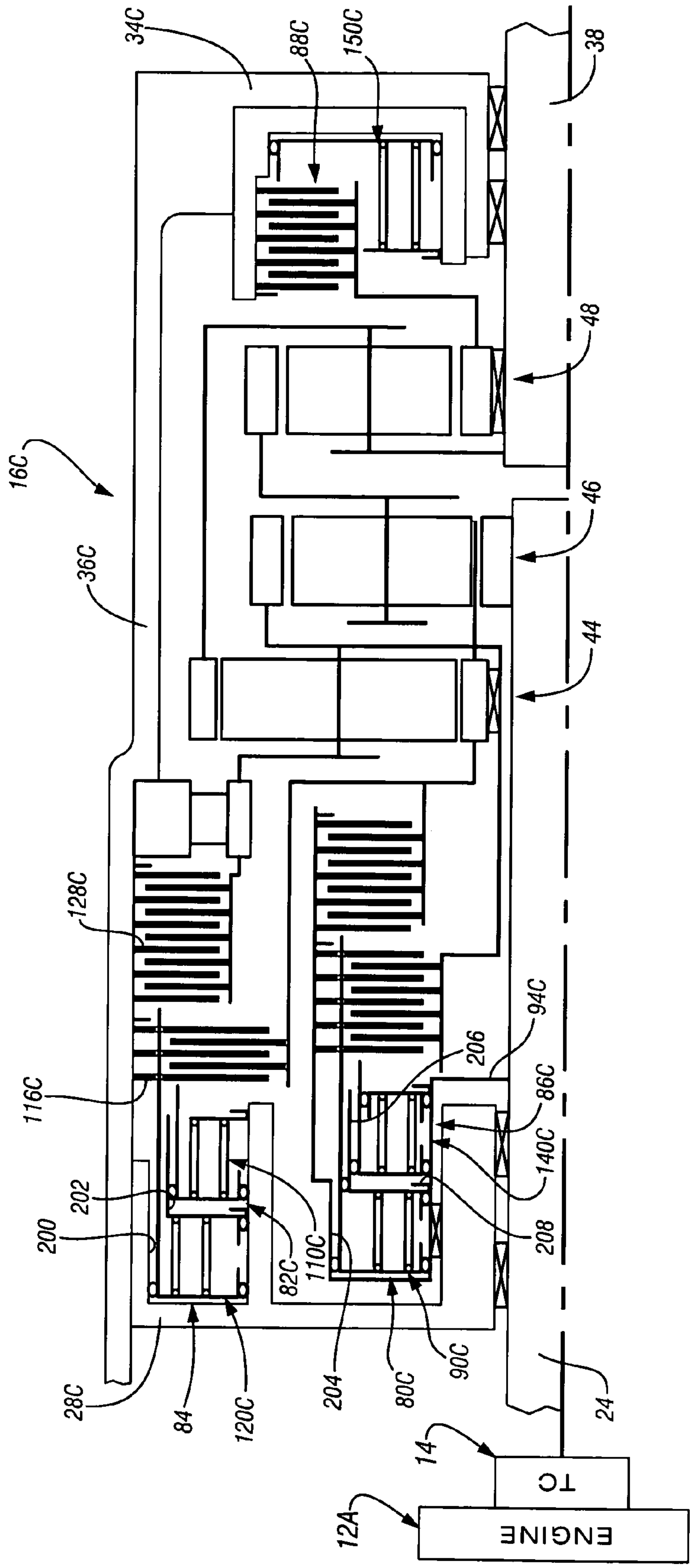
FIG. 4 is yet another embodiment of the present invention.

The diagrammatic depiction of the power transmission 16C of FIG. 4 shows the servomechanisms 110C and 120C of torque-transmitting mechanisms 82C and 84C, respectively, as being slidably disposed in a housing formed on the front end wall 28C. The front end wall 28C has a first chamber 200, which supports the servomechanism 120C and a second chamber 202 secured thereto, which supports the servomechanism 110C.

The servomechanisms 90C and 140C of the torque-transmitting mechanisms 80C and 86C, respectively, are supported in a rotatable housing 94C, which is similar to the housing 94 of FIG. 1. However, the housing 94C has a first chamber 204, which supports the servomechanism 90C and a second chamber 206, which supports the hydraulic servomechanism 140C. The chamber 206 is supported on the housing 94C and held in rotation in the aft direction by a conventional locking ring or retaining ring 208. The torque-transmitting mechanism 88C has the hydraulic servomechanism 150C thereof slidably supported on the rear end wall 34C.

As with the depictions of FIGS. 2 and 3, the friction plates 116C and 128C of the torque-transmitting mechanisms 82C and 84C, respectively, are drivingly connected to splines with the shell or housing 36C. The torque-transmitting mechanisms 80C, 82C, 84C, 86C, and 88C are energized and manipulated in the same sequence as that described above for FIG. 1. Therefore, this embodiment of the present invention also provides six forward speed ratios and one reverse speed ratio. The only significant difference between the transmission described for FIG. 1 and the transmission shown in FIG. 4 is the axial positioning of the torque-transmitting mechanisms 80C and 86C and the axial positioning of the torque-transmitting mechanisms 82C and 84C, and in that all four torque-transmitting mechanisms are disposed as being supported on the front end wall 28C.

Figure 5:
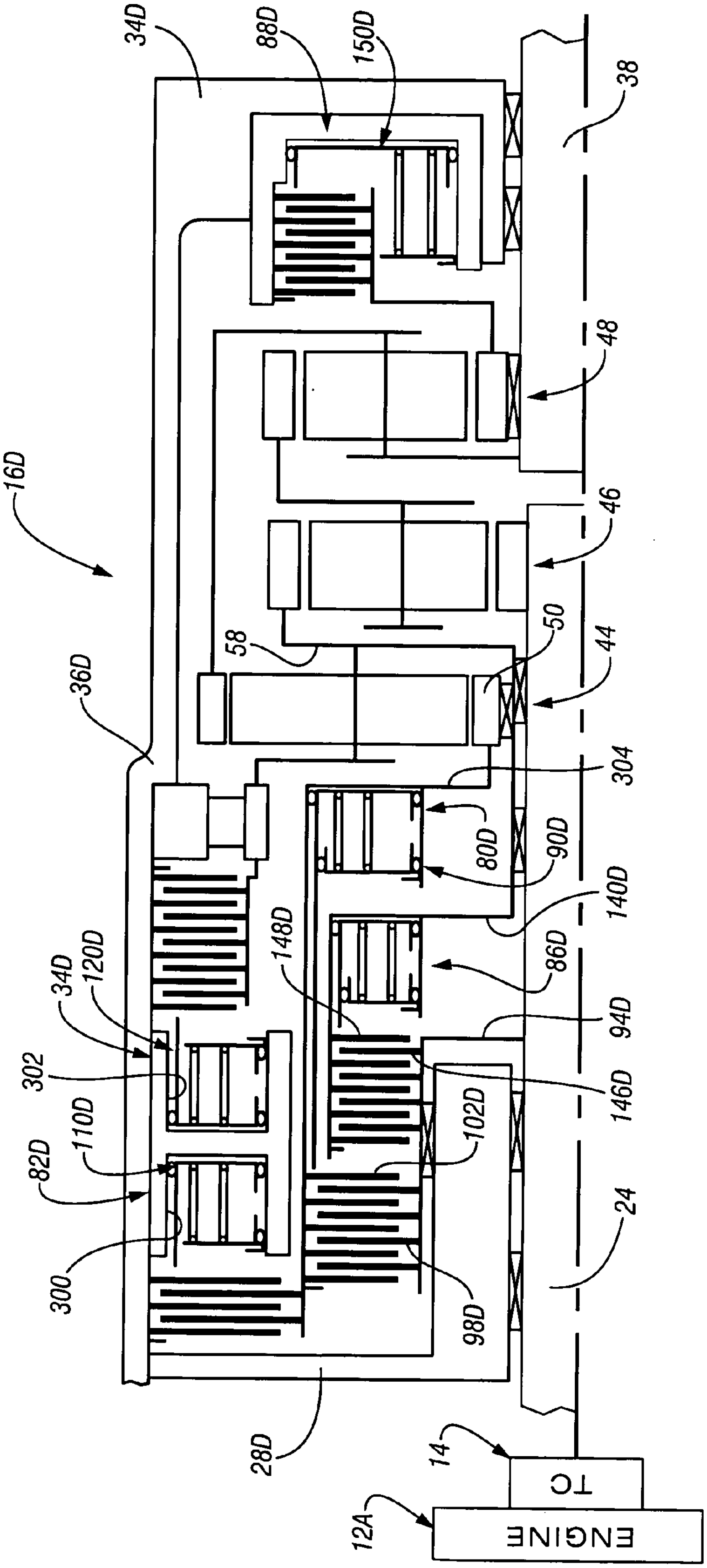
FIG. 5 is a diagrammatic depiction of a yet further embodiment of the present invention.

The power transmission 16D shown in FIG. 5 includes the torque-transmitting mechanisms 80D, 82D, 84D, 86D, and 88D. The torque-transmitting mechanisms 82D and 84D have their respective hydraulic servomechanisms 110D and 120D supported in chambers 300 and 302, respectively, which are formed on the shell 36D either integral therewith or as rigid members affixed thereto. The torque-transmitting mechanism 80D has the servomechanism 140D thereof slidably disposed on a housing 304, which is continuously connected between the sun gear member 50 and the friction plates 102D.

The friction plates 98D of the torque-transmitting mechanism 80D are splined to a housing 94D, which is drivingly connected with the input shaft 24. The torque-transmitting mechanism 86D has the servomechanism 140D thereof slidably disposed in a housing 306, which is continuously connected between the planet carrier member 58 and the friction plates 148D. The friction plates 146D of the torque-transmitting mechanism 86D are drivingly connected through splines with the housing 94D.

The torque-transmitting mechanisms 80D, 82D, 84D, 86D, and 88D provide the same functions as their counterparts shown in FIG. 1. The only significant difference between the transmissions depicted in FIGS. 1 and 5 is the disposition of the servomechanisms 110D and 120D being disposed on the shell 36D. The torque-transmitting mechanisms 80D and 86D have their respective servomechanisms 90D and 140D supported on rotatable housings 304 and 306, respectively, and the friction plates thereof splined to the housing 94D. Also, the torque-transmitting mechanism 86D is disposed forward of the planetary gearset 44 similar to the positioning of the transmission 16C shown in FIG. 4. The torque-transmitting mechanism 88D is in the same location and similarly supported as it has been in the depictions of FIGS. 1, 2, 3, and 4.

The difference seen between the transmission 16C and 16D shown in FIGS. 4 and 5 with regard to the torque-transmitting mechanisms 80D and 86D is that the servomechanisms 90D and 140D thereof are supported in rotatable housings 304 and 306 which are drivingly connected with planetary gear members in FIG. 5 whereas the servomechanisms of torque-transmitting mechanisms 80C and 86C are both rotatably supported in the housing 94C, which is drivingly connected with the input shaft 24. In both instances, the supporting housings are rotatable members disposed within the casing of the transmission. As with FIG. 4, the torque-transmitting mechanisms 80D and 86D are axially aligned, as are the torque-transmitting mechanisms 82D and 84D. It will be noted that the servomechanisms of 82D and 84D are disposed back-to-back and are actuated in opposite directions; however, the operating functions of these torque-transmitting mechanisms do not change.

Figure 6:
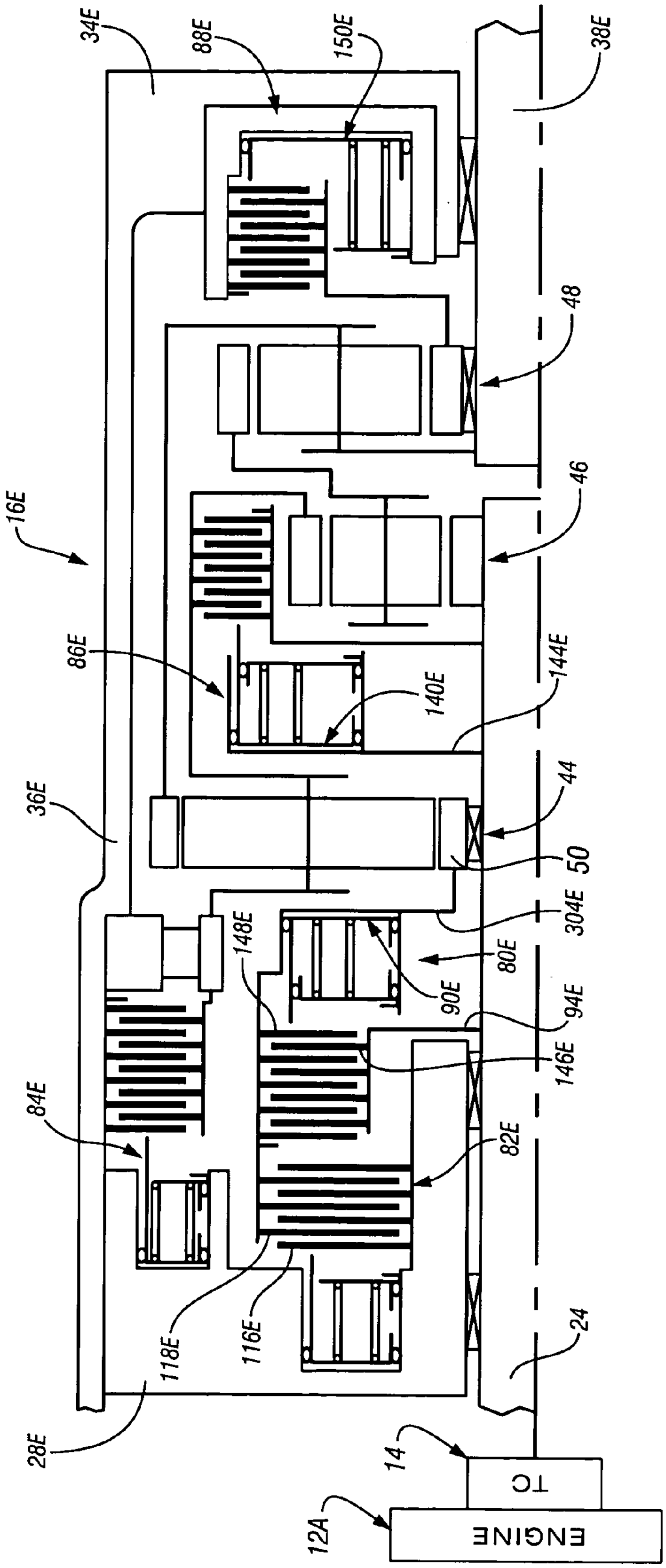
FIG. 6 is a diagrammatic depiction of a still further embodiment of the present invention.

The power transmission 16E shown in FIG. 6 includes the torque-transmitting mechanisms 80E, 82E, 84E, 86E, and 88E as well as the planetary gearsets 44, 46, and 48. The torque-transmitting mechanisms are actuated in the same sequence as described above for FIGS. 1 through 5 to provide six forward speed ratios and one reverse speed ratio between the input shaft 24 and the output shaft 38.

In comparing the torque-transmitting mechanisms of FIG. 6 with the other Figures, it can be seen that the torque-transmitting mechanisms 82E and 84E are disposed similarly to the torque-transmitting mechanisms shown in FIG. 3 as 82B and 84B. The torque-transmitting mechanism 88E is disposed the same as it was depicted in FIGS. 1 through 5. The torque-transmitting mechanism 86E is disposed similarly to the torque-transmitting mechanism 86A in that it is disposed between the planetary gearsets 44 and 46 and has the servomechanism 140E thereof disposed within a rotatable housing 144E, which is drivingly connected with the input shaft 24.

The torque-transmitting mechanism 80E has the servomechanism 90E thereof disposed in a housing 304E, which is connected between the sun gear member 50 and the friction plates 148E of the torque-transmitting mechanism 80E. This is similar to the torque-transmitting mechanism 80D with the exception that it is axially aligned with the torque-transmitting mechanism 82E rather than with the torque-transmitting mechanism 86D. As regards the torque-transmitting mechanism 82E, the friction plates 116E are drivingly connected through splines with the front end wall 28E while the friction plates 118E are splined with the housing 304E, which as previously mentioned is continuously connected with the sun gear member 50.

The torque-transmitting mechanisms depicted in FIGS. 1 through 6 are located within the transmission housing 32 in a manner such that the barrel size or outer dimension of the transmission is kept to a minimum in the area of the planetary gearsets and afterward. This is important in longitudinally-disposed powertrains since the transmission requires a hump or intrusion into the passenger compartment between the driver and passenger of the front seat. It is desirable to maintain the hump at a minimum so as to increase the comfort and cabin space within the vehicle. By locating the majority of the torque-transmitting mechanisms either forward of the planetary gearsets or radially stacked at minimum radius between the planetary gearsets, this design desirability is accomplished with the depictions of the transmissions of FIGS. 1 through 6.

What is claimed is:

1. A power transmission comprising:

a transmission housing comprising a front end wall, a rear end wall, and a gear housing joining said front end wall and said rear end wall and cooperating therewith to define a gear space;

an input shaft rotatably supported in said front end wall;

an output shaft rotatably supported in said rear end wall;

a planetary gear arrangement having first, second, and third planetary gearsets with each planetary gearset having a sun gear member, a ring gear member, and a planet carrier member, said sun gear member of said second planetary gearset being continuously connected with said input shaft for co-rotation therewith, said ring gear member of said first planetary gearset and said planet carrier member of said third planetary gearset being continuously connected with said output shaft for co-rotation therewith, said planet carrier member of said first planetary gearset and said ring gear member of said second planetary gearset being continuously interconnected, and said planet carrier member of said second planetary gearset and said ring gear member of said third planetary gearset being continuously interconnected;

a first torque-transmitting mechanism having a servomechanism with a fluid-operated piston supported on said front end wall and being operable to selectively interconnect said input shaft with said sun gear member of said first planetary gearset;

a second torque-transmitting mechanism having a servomechanism with a fluid operated non-rotatable piston slidably supported in a first chamber formed in said front end wall and being selectively operable to connect said sun gear member of said first planetary gearset with said transmission housing;

a third torque-transmitting mechanism having a servomechanism with a fluid-operated non-rotatable piston slidably supported in a second chamber formed in said front end wall and being selectively operable to connect said planet carrier member of said first planetary gearset with said transmission housing;

a fourth torque-transmitting mechanism having a servomechanism disposed in an axial space between said first planetary gearset and said second planetary gearset and having a fluid-operated piston slidably disposed in a housing rotatable with said input shaft and being operable to selectively connect said input shaft with said planet carrier member of said first planetary gearset; and a fifth torque-transmitting mechanism having a servomechanism with a fluid-operated non-rotatable piston slidably disposed in a chamber formed in said rear end wall and being operable to selectively connected said sun gear member of said third planetary gearset with said transmission housing.

2. A power transmission comprising:

a transmission housing comprising a front end wall, a rear end wall, and a gear housing joining said front end wall and said rear end wall and cooperating therewith to define a gear space;

an input shaft rotatably supported in said front end wall;

an output shaft rotatably supported in said rear end wall;

a planetary gear arrangement having first, second, and third planetary gearsets with each planetary gearset having a sun gear member, a ring gear member, and a planet carrier member, said sun gear member of said second planetary gearset being continuously connected with said input shaft for co-rotation therewith, said ring gear member of said first planetary gearset and said planet carrier member of said third planetary gearset being continuously connected with said output shaft for co-rotation therewith, said planet carrier member of said first planetary gearset and said ring gear member of said second planetary gearset being continuously interconnected, and said planet carrier member of said second planetary gearset and said ring gear member of said third planetary gearset being continuously interconnected;

a first torque-transmitting mechanism having a servomechanism with a fluid-operated piston supported in a housing disposed on either said front end wall or between said front end wall and said first planetary gearset or between said first and second planetary gearsets and being operable to selectively interconnect said input shaft with said sun gear member of said first planetary gearset;

a second torque-transmitting mechanism having a servomechanism with a fluid operated non-rotatable piston slidably supported in a first chamber formed in either said front end wall or said gear housing and being selectively operable to connect said sun gear member of said first planetary gearset with said transmission housing;

a third torque-transmitting mechanism having a servomechanism with a fluid-operated non-rotatable piston slidably supported in a second chamber formed in either said front end wall or said gear housing and being selectively operable to connect said planet carrier member of said first planetary gearset with said transmission housing;

a fourth torque-transmitting mechanism having a servomechanism disposed in either an axial space between said first planetary gearset and said second planetary gearset or between said front end wall and said first planetary gearset and having a fluid-operated piston slidably disposed in a housing rotatable with said input shaft and being operable to selectively connect said input shaft with said planet carrier member of said first planetary gearset; and a fifth torque-transmitting mechanism having a servomechanism with a fluid-operated non-rotatable piston slidably disposed in a chamber formed in said rear end wall and being operable to selectively connected said sun gear member of said third planetary gearset with said transmission housing.

3. The power transmission defined in claim 2 further comprising:

said servomechanisms of said first and fourth torque-transmitting mechanisms having the respective fluid operated pistons thereof substantially coaxially aligned and said servomechanisms of said second and third torque-transmitting mechanisms having the respective fluid operated non-rotatable pistons thereof substantially coaxially aligned.

4. The power transmission defined in claim 2 further comprising:

said servomechanisms of said first and second torque-transmitting mechanisms having the respective fluid operated rotatable and non-rotatable pistons respectively thereof substantially coaxially aligned.

5. The power transmission defined in claim 2 further comprising:

said servomechanisms of said first and fourth torque-transmitting mechanisms having the respective fluid operated pistons thereon substantially radially aligned, and said servomechanisms of said second and third torque-transmitting mechanisms having the respective fluid operated non-rotatable pistons thereof being radially stacked and supported in said front end wall.

6. The power transmission defined in claim 2 further comprising:

said servomechanisms of said second and third torque-transmitting mechanisms having the respective fluid operated non-rotatable pistons thereof substantially coaxially aligned.

* * * * *